Dec. 14, 1926.  
C. PEEBLES  
1,611,062  
PISTON TIMING GAUGE  
Filed May 9, 1925

Inventor  
Charles Peebles  
By Adam E. Fisher.  
Attorney

Patented Dec. 14, 1926.

1,611,062

UNITED STATES PATENT OFFICE.

CHARLES PEEBLES, OF YONKERS, NEW YORK.

PISTON-TIMING GAUGE.

Application filed May 9, 1925. Serial No. 29,106.

This invention is a gauge for locating and timing the pistons of explosive or gas engines.

The object is to provide a simple and practical instrument for enabling mechanics and others to readily locate and properly time the several pistons of a gas engine so as to properly and exactly meet the spark on compression. This timing is ordinarily done by the aid of marks on the engine fly wheel or by means of wires thrust through the spark plug, or valve openings. But these methods are crude and uncertain, and besides there is no way of knowing by these means whether the pistons are on the compression strokes or on the exhaust strokes. In the present device means are provided for determining these facts.

In the drawing—

Figure 1:
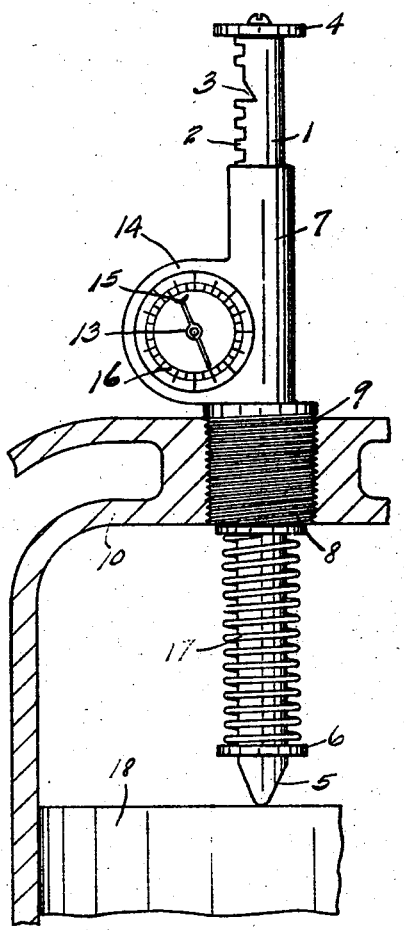
Figure 1 is a perspective view of the device as attached to a cylinder block, a portion of the block being removed to show the operation of the tool inside the cylinder.
Figure 2:
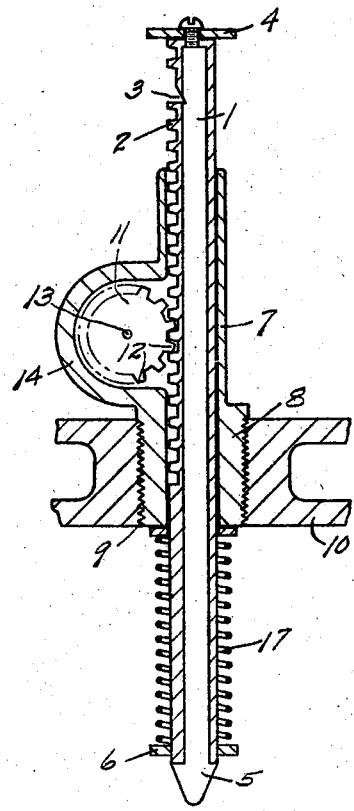
Figure 2 is a vertical section through the device and a portion of the cylinder upon which it is mounted.
Figure 3:
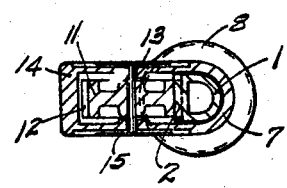
Figure 3 is a transverse section.

The invention includes a tubular shaft 1 which is D-shaped on a cross section as shown in Figure 3, and which is provided with a rack 2 along its flattened side. A whistle hole 3 is cut in the end of the shaft which is to be utilized as the outer end, and a stop washer 4 is mounted on this end. The lower end of the tubular shaft 1 is apertured laterally as shown at 5, and a fixed washer 6 is mounted immediately above this apertured end. This shaft 1 is slidingly passed through a snugly fitting sleeve 7 which is provided with a threaded plug 8 at its lower end adapted to screw into the spark plug opening 9 of the cylinder 10. The wall of the sleeve 7 is cut away immediately above the plug 8 so as to form an elongated slot or opening through to meet the rack 2. A gauge wheel 11 having teeth 12 is journaled at 13 in the housing 14 attached to the sleeve 7, the teeth 12 being set in mesh with the rack 2. A pointer 15 is fixed to the outer end of the axle 13 and adapted to traverse the annularly arranged degree or gauge marks 16 formed on the outer face of the housing 14. A coil spring 17 is set over the lower end of the shaft 1, being braced between the lower end of the plug 8 and the washer 6. This spring acts to normally throw the shaft 1 downwardly.

In use, the plug 8 is screwed into the spark plug opening 9 of the cylinder 10, which is preferably cylinder numbered 1 of the engine. The crank shaft is then slowly turned by hand, and the piston 18, moving upwardly, forces the shaft 1 upwardly and thereby causes the pointer 15 to traverse the gauge marks 16. By adjusting the pointer 15 so that it will stand in its exact vertical position at the same time that the piston 18 and shaft 1 are in their uppermost positions, the pointer will of course show when any piston is at its highest point. Whether the piston is rising on its exhaust or compression stroke is readily determined by the sound of the whistle 3, since that sound will be more distinct and pronounced on the compression stroke. By turning off the gas supply and leaving ignition on, slowly cranking the engine, watching the sparks in connection with the position pointed on the gauge marks, and listening to the whistle, it is an easy matter to quickly and accurately time the pistons.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In a device for facilitating the timing of the ignition system of an internal combustion engine, the combination of a sleeve adapted to fit into the spark plug hole; a tubular shaft slidably mounted through the sleeve, the said shaft having a whistle formed therein; and a gauge mounted on the sleeve and controlled by the sliding motion of the shaft.

2. In a device of the kind described, a sleeve adapted to fit in the spark plug hole of a gas engine, the sleeve having an aperture cut through the wall of its outer end; a tubular shaft slidingly mounted through the sleeve, the said shaft having a whistle arranged in its outer end and lateral openings at its inner end; a gauge wheel mounted on the sleeve and set in engagement with the sliding shaft through the aperture in the wall of the sleeve; and means apart from gravity for normally forcing the shaft downward into the cylinder.

In testimony whereof I affix my signature.

CHARLES PEEBLES.